United States Patent [19]

Kilström

[11] Patent Number: 5,704,091
[45] Date of Patent: Jan. 6, 1998

[54] WHEEL FOR A VACUUM CLEANER NOZZLE OR FOR A VACUUM CLEANER

[75] Inventor: Lars Gunnar Kilström, Täby, Sweden

[73] Assignee: Aktiebolaget Electrolux, Stockholm, Sweden

[21] Appl. No.: 554,435

[22] Filed: Nov. 6, 1995

[30] Foreign Application Priority Data

Dec. 12, 1994 [SE] Sweden .................. 9404314

[51] Int. Cl.[6] ................. B60B 1/06; B60B 9/10
[52] U.S. Cl. ................. 15/339; 15/327.1; 152/310
[58] Field of Search ........... 15/351, 339, 327.1; 152/310, 246

[56] References Cited

U.S. PATENT DOCUMENTS 4,530,543  7/1985  Keane ............ 15/327.1 X
5,255,410  10/1993  Stein et al. ........... 15/351

FOREIGN PATENT DOCUMENTS 59-171701  9/1984  Japan.
4-33624  2/1992  Japan.

*Primary Examiner*—Chris K. Moore
*Attorney, Agent, or Firm*—Pearne, Gordon, McCoy & Granger LLP

[57] ABSTRACT

A wheel for a vacuum cleaner nozzle or for a vacuum cleaner having a central part (10a, 10b) of comparatively hard material to which a tread is secured. The tread (14) is formed from a soft material having a low friction coefficient, such as a felt material.

11 Claims, 1 Drawing Sheet

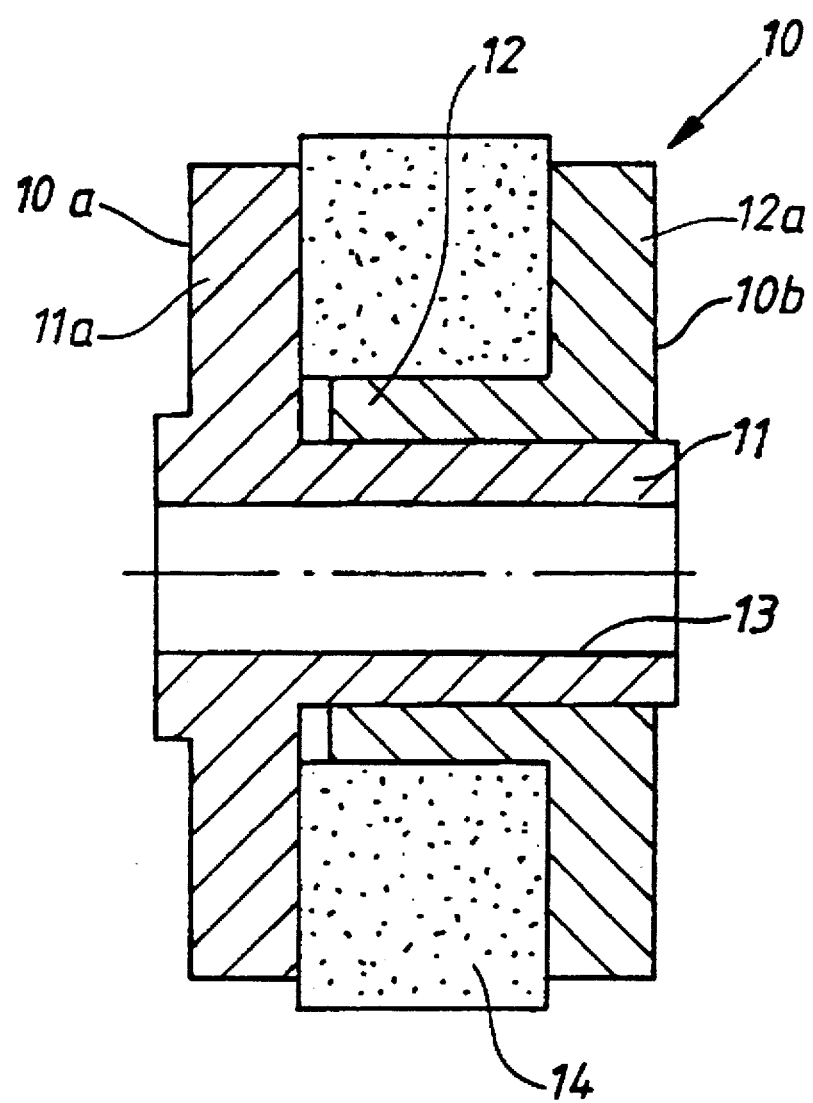

WHEEL FOR A VACUUM CLEANER NOZZLE OR FOR A VACUUM CLEANER

BACKGROUND OF THE INVENTION

This invention relates to a wheel for a vacuum cleaner nozzle or for a vacuum cleaner.

Vacuum cleaner nozzles are sometimes provided with wheels in order to improve certain operational features, and the wheels are usually made of hard plastic. A disadvantage with such wheels is that they can easily scratch the floor. In order to eliminate this drawback, it has been suggested to provide the wheels with a rubber tread and this is, for instance, described in DE 3520119. However, such an arrangement makes the nozzle difficult to move sideways due to the high friction between the rubber tread and the underlying floor.

Therefore, there exists a need in the art for a vacuum cleaner nozzle wheel which is easy to move in any direction and which will not scratch the floor.

SUMMARY OF THE INVENTION

The present invention provides a wheel which allows a vacuum cleaner nozzle to be moved in any direction on the floor without any significant resistance and which does not scratch the floor. The wheel according to the invention can also advantageously be used to support a vacuum cleaner.

In accordance with the present invention, a wheel has a central part defining an annular groove which receives a tread of soft material with a low coefficient of friction. The tread is preferably formed from natural and/or synthetic fibers which are bonded together by felting, weaving, or by bonding agents.

BRIEF DESCRIPTION OF THE DRAWING

An embodiment of the invention will now be described with reference to the accompanying drawing which shows a vertical section through a wheel according to the invention.

DETAILED DESCRIPTION OF THE PREFERRED EMBODIMENT

As appears from the FIGURE, the wheel comprises a central part 10 formed from a comparatively hard material, such as a hard plastic. The central part 10 may be formed in one piece but preferably, as is shown in the FIGURE, is formed as first and second parts 10a, 10b.

The first part 10a has a laterally extending hub portion 11 on which a like hub portion 12 of the second part 10b is positioned. The hub portion 11 has a bore 13 through which a shaft, not shown, can be inserted and secured to the nozzle.

The first and second parts 10a, 10b each include a radially extending flange 11a, 12a which is generally perpendicular to their respective hubs 11, 12, as illustrated. An annular tread 14 is received in the groove formed between the flanges 11a, 11b of the first and second parts 10a, 10b.

The annular tread 14 is made from soft material having a small friction coefficient such as, for instance, a felted cloth. The inner periphery of the tread 14 rests on the second part hub portion 12 and is clamped between the flanges 11a, 12a.

The first and second parts 10a, 10b are fixed with respect to each other in a suitable manner, such as adhesives, vibration or ultrasonic welding, gluing, or by means of screw joints. The term "soft material" as used herein means a material comprising natural and/or synthetic fibers which are bonded together by means of felting, weaving, or by means of bonding agents.

It should be apparent that the preferred embodiment of the present invention described hereinbefore is capable of numerous modifications, substitutions, or rearrangements of parts without departing from the scope and spirit of the invention as defined by the claims appended hereto.

What is claimed is:

1. A wheel for a vacuum cleaner nozzle or for a vacuum cleaner, said wheel (10) comprising a central part (10a, 10b) of relatively hard material and a tread of relatively soft fiber material with a low friction coefficient, wherein the central part supports said tread (14) of fiber material and said fiber material is selected from the group of natural fiber material and synthetic fiber material.

2. A wheel according to claim 1 wherein said fiber material is felted.

3. A wheel according to claim 1, wherein the central part includes first and second parts (10a, 10b) which are connected to each other and between which the tread (14) is clamped.

4. A wheel according to claim 3, wherein the first and second parts include hubs which are secured to one another.

5. A wheel according to claim 4, wherein the first and second parts include flanges that extend radially from the hubs, an annular groove being defined by a space between said flanges and receiving said tread.

6. A wheel according to claim 5, wherein said fiber material is felted.

7. A wheel according to claim 5, wherein said fiber material is woven.

8. A wheel according to claim 5, wherein said fiber material is held together by bonding agents.

9. A wheel according to claim 1, wherein said fiber material is a cloth.

10. A wheel according to claim 1, wherein said fiber material is woven.

11. A wheel according to claim 1, wherein said fiber material is held together by bonding agents.

* * * * *